United States Patent [19]

Galik

[11] Patent Number: 4,595,571

[45] Date of Patent: Jun. 17, 1986

[54] LIQUID-LIQUID EXTRACTOR AND METHOD FOR USING SAME

[76] Inventor: George M. Galik, 3236 Falcon Ridge Rd., Diamond Bar, Calif. 91765

[21] Appl. No.: 647,994

[22] Filed: Sep. 5, 1984

[51] Int. Cl.$^4$ .............................................. B01D 11/04
[52] U.S. Cl. .................................... 422/259; 209/159; 210/511; 210/522; 422/258; 423/8; 423/9; 423/10
[58] Field of Search .............................. 422/258, 259; 423/8-10; 210/511, 522; 209/159

[56] References Cited

U.S. PATENT DOCUMENTS

| | | |
|---|---|---|
| 801,679 | 10/1905 | Niclausse . |
| 1,013,881 | 1/1912 | Kohn . |
| 2,405,158 | 8/1946 | Mensing ............................... 422/259 |
| 2,551,815 | 5/1951 | Schulz ............................ 422/258 X |
| 2,668,756 | 2/1954 | Carney . |
| 3,013,866 | 12/1961 | Sumaniego et al. ............. 422/259 X |
| 3,206,288 | 9/1965 | Hazen et al. . |
| 3,544,079 | 12/1970 | Dressler . |
| 3,989,467 | 11/1976 | Paige . |
| 4,040,793 | 8/1977 | Achsel et al. ........................ 422/259 |
| 4,221,658 | 9/1980 | Hardwick . |
| 4,268,484 | 5/1981 | Gavin . |
| 4,295,277 | 9/1981 | Bonney et al. . |
| 4,391,711 | 7/1983 | Jackson et al. . |

OTHER PUBLICATIONS

The Combined Mixer-Settler: *A New Development in Solvent Extraction*, TMS Paper Selection No. A81-50, The Metallurgical Society of AIME, by C. F. Bonney, G. A. Rowden and D. McKee.

*Primary Examiner*—Robert Lindsay
*Attorney, Agent, or Firm*—Christie, Parker & Hale

[57] ABSTRACT

An apparatus is provided that is useful for effecting liquid-liquid extraction by contacting a first liquid medium with a substantially immiscible heavier second liquid medium. Each mixer-settler unit includes a vertically extending settling tank having a top and a bottom with an outlet for the first liquid medium near the top and an outlet for the second liquid medium near the bottom. An elongated extraction column extends generally vertically upwardly through the settling tank bottom. The extraction column is open at its top with the top of the extraction column below the top of the settling tank. A diverter surrounds and extends downwardly along a top portion of the extraction column. The diverter has a closed top and an open bottom with an annulus being between the diverter and the portion the extraction column surrounded by the diverter. The dispersion flows from the pumping and mixing means upwardly through the extraction column and out its top. The dispersion then flows downwardly from the top of the extraction column through the annulus between the diverter and extraction column and exits the open bottom of the diverter into the settling tank.

33 Claims, 3 Drawing Figures

LIQUID-LIQUID EXTRACTOR AND METHOD FOR USING SAME

FIELD OF THE INVENTION

This invention relates to a process and apparatus useful for effecting liquid-liquid extraction.

BACKGROUND OF THE INVENTION

Processes which result in the mass transfer of one or more components contained in a first liquid medium having a given specific gravity, to a second substantially immiscible liquid medium having a different specific gravity by intimately contacting the liquids together are called liquid-liquid extraction processes. Such extraction processes have been used for many years and may be carried out in a number of ways. Typically, the liquid solution to be treated is initially brought into intimate contact with a suitable substantially immiscible liquid which preferentially extracts one or more components from the solution. Since the liquids have different specific gravities, they are then allowed to separate from each other, for example, by gravity, and are recovered. The components that are extracted by such a process may be liquids, solids or ionic species, for example.

In one application of such a liquid-liquid extraction process, components which are soluble in organic solvents can be removed (extracted) from an aqueous solution by intimately contacting the aqueous with a suitable water immiscible organic extractant, followed by phase separation. Similarly, acidic or basic components of an organic solution can be removed by contacting the organic solution with an alkaline or acidic aqueous solution as appropriate.

In yet another application of a liquid-liquid extraction process, an aqueous solution containing an ionic species can be contacted with a liquid "ion exchange material" which forms all or part of an organic medium that is immiscible with the aqueous phase. Upon such contact, the ionic species combines with the ion exchange material (ion exchanger) to thereby form a compound that is soluble in the organic but insoluble in the aqueous. One example of a liquid ion exchanger is a hydroxy oxime exchanger which is useful to extract copper from acidic or basic aqueous solutions containing copper ions. Typical of such a hydroxy oxime ion exchanger is a product sold under the trademark "LIX 64N" by Henkel Corporation, 1844 West Grant Road, Suite 104, Tucson, Ariz., 85745-1273.

As is mentioned above, in liquid-liquid extraction processes, two immiscible liquids are brought into intimate contact for the purpose of the mass transfer of one or more components from one liquid (or phase) to another liquid followed by physical separation of the two liquids. Any device or combination of devices which accomplishes such mixing and separation one time is called a stage. Since in each such stage, mixing of two immiscible liquids takes place and the resulting dispersion is allowed to settle out to thereby separate the phases, such devices or units are usually called mixer-settlers.

In many instances, a liquid-liquid extraction plant includes a plurality of mixer-settler units arranged in series. For example, such an extraction plant can include one or more mixer-settler units that make up an "extraction section" in which a material is transferred from one liquid medium (the feed) into a second liquid medium (the extractant) as is described above. The plant can also incldue one or more mixer settler units in series with the "extraction section" to provide a "stripping section". In the mixer-settler units of the stripping section the pregnant extractant (extract), i.e., the extractant containing the material transferred to it, is contacted with an immiscible liquid medium capable of removing the transferred material from the extractant. The regenerated extractant can then be recovered from the stripping section and recycled back to the extraction section. Additionally, the liquid containing the transferred material (the raffinate) can either be discarded or treated by various means to recover the transferred material.

In one example of using a multi-stage extraction plant for removing copper ion from an aqueous phase, there can be four mixer-settler units in series. For example, two mixer-settler units in series with each other can be used as an "extraction section" in which an organic medium, such as a mixture of kerosene and "LIX 64N" (ion exchanger), is brought into intimate contact with an aqueous phase, preferably at a pH greater than about 2 and containing copper ion. In the extraction section, the copper ion is removed from the aqueous phase and transferred to the organic medium by means of the "LIX 64N" ion exchanger. Two mixer-settler units can be arranged in series with the extraction units to provide a "stripping section". In the stripping section a solution of sulfuric acid, preferably at a pH less than about 2, can be brought into intimate contact with the copper containing organic phase to thereby remove the copper from the organic as copper sulfate. The regenerated organic can then be returned to the first mixer-settler unit of the extraction section as fresh organic to start the cycle over again and the copper can be recovered from the sulfuric acid solution, for example, by electrowinning.

There are mixer-settler units of a wide variety of designs presently known in the art. For example, U.S. Pat. No. 3,989,467 discloses a unit which includes a mixing tank where liquids are mixed to form a dispersion which then flows into a settling tank located next to the mixing tank. The liquids flow horizontally across the settling tank and during this horizontal flow, three horizontally extending layers develop; the upper and lower layers are formed by the coalesced phases as the liquids separate from the dispersion, while the middle layer, which is usually only a few inches in depth, is a dispersion of one of the liquids in the other. The separated phases are removed from the end of the settling tank remote from the mixing tank by means of suitably located weirs. Attempts to reduce the horizontal cross-sectional area of such settling tanks for a given flow rate of dispersion can result in a disproportionate increase in the depth of the dispersion layer and accordingly, can result in flooding of the settler with dispersion. This results in carryover of one of the liquids in the other and inefficiencies in operation.

The large size of conventional horizontal gravity settlers, such as the unit described above, requires that an undesirably large inventory of organic liquids be maintained in the settler. Additionally, such horizontal units can take up much more ground or floor space than is desired.

U.S. Pat. No. 4,221,658 addresses the problem of undesirably large organic inventories and horizontal cross-sections associated with horizontal units by providing a generally vertical mixer settler unit where both mixing and settling are carried out in the same vessel. The mixing zone, where the immiscible liquids are mixed together to form a dispersion, is at the center of height of the vessel and the coalescing zones into which the immiscible liquids of the dispersion settle out are above and below the mixing zone.

There remains a need in the art, however, for a vertical mixer-settler unit with an improved design for enhancing the mass transfer and extraction as well as the complete separation of the immiscible liquids from the dispersion so that carryover is minimized.

SUMMARY OF THE INVENTION

In accordance with this invention, a vertical mixer-settler unit is provided that is useful for contacting a first liquid medium with a second substantially immiscible heavier liquid medium to effect extraction of a component contained in one of the liquid mediums by the other liquid medium. The mixer-settler unit includes a settling tank having a top and a bottom, wherein an outlet for the first liquid medium is near the top and an outlet for the second liquid medium is near the bottom. An elongated extraction column extends generally vertically upwardly through the settling tank bottom with the top of the extraction column being open and below the top of the settling tank. A diverter having a closed top and an open bottom surrounds and extends downwardly along a top portion of the extraction column. An annulus is between the diverter and the portion of the extraction column that is surrounded by the diverter. Mixing and pumping means are provided in liquid communication with the extraction column for mixing the first and second liquid mediums together to thereby form a dispersion of droplets of one of the liquid mediums in the other liquid medium and for pumping the liquids through the unit toward the settling tank outlets. The dispersion flows from the mixing and pumping means upwardly through the extraction column and out its top. From the top of the extraction column the dispersion flows downwardly through the annulus between the diverter and extraction column so that the dispersion exits the open bottom of the diverter into the settling tank. The first liquid medium separates from the dispersion, rises to the top of the settling tank and exits the settling tank from the outlet near the settling tank top. The second, relatively heavier liquid medium separates from the dispesion, sinks to the bottom of the settling tank and exits the settling tank from the outlet near the settling tank bottom.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

Figure 1:
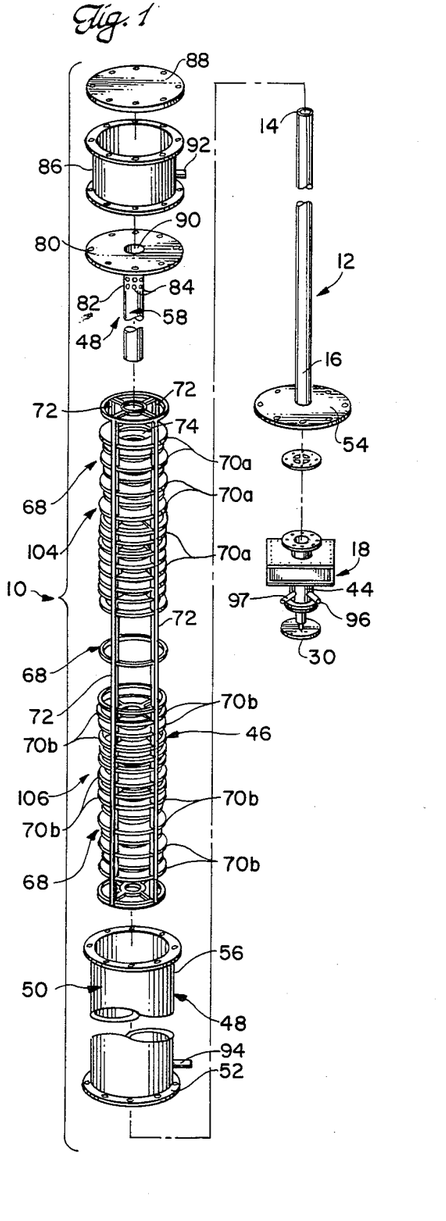
FIG. 1 is a semi-schematic exploded perspective view of a preferred embodiment of a mixer-settler unit provided in accordance with practice of principles of the invention.
Figure 2:
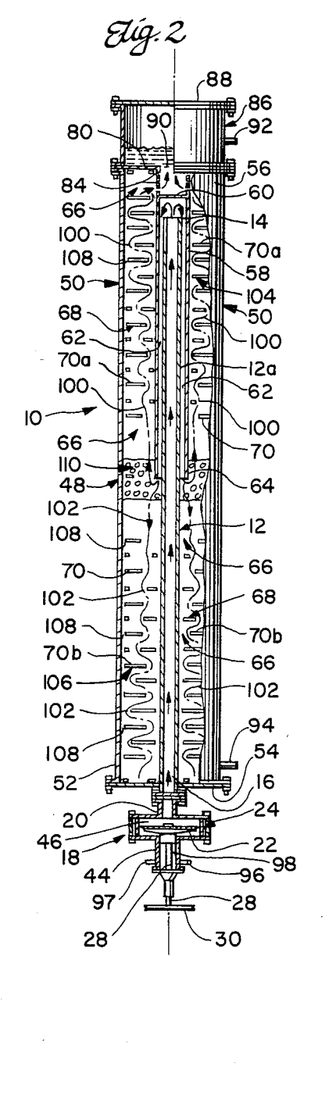
FIG. 2 is a semi-schematic fragmentary elevational view in partial cross section of the mixer-settler unit of FIG. 1.

Referring to the accompanying drawings, and particularly to FIGS. 1 and 2, thereof, there is shown a preferred embodiment of a mixer-settler unit 10 provided in accordance with this invention. The unit 10 can be used alone or it can be combined in series with other such units to effect liquid-liquid extraction. Since the assembled mixer-settler unit 10 of this invention is designed for use in a vertical configuration, for example, as is shown in FIG. 2, the position of the components of the unit relative to each other and the flow of liquids through the unit are described below as if the unit is vertical.

While it should be understood that virtually any liquid-liquid extraction operation can be carried out in the mixer-settler unit 10 of this invention, the unit 10 is described below with regard to extraction of copper from an aqueous solution by contacting the aqueous solution with an organic medium comprising a mixture of "LIX 64N" and kerosene.

The mixer-settler unit 10 includes an elongated extraction column 12 open at its top and bottom ends 14 and 16, respectively. In the illustrated embodiment the extraction column 12 is cylindrical and when installed, its longitudinal axis is vertically arranged as is shown in FIG. 2.

Figure 3:
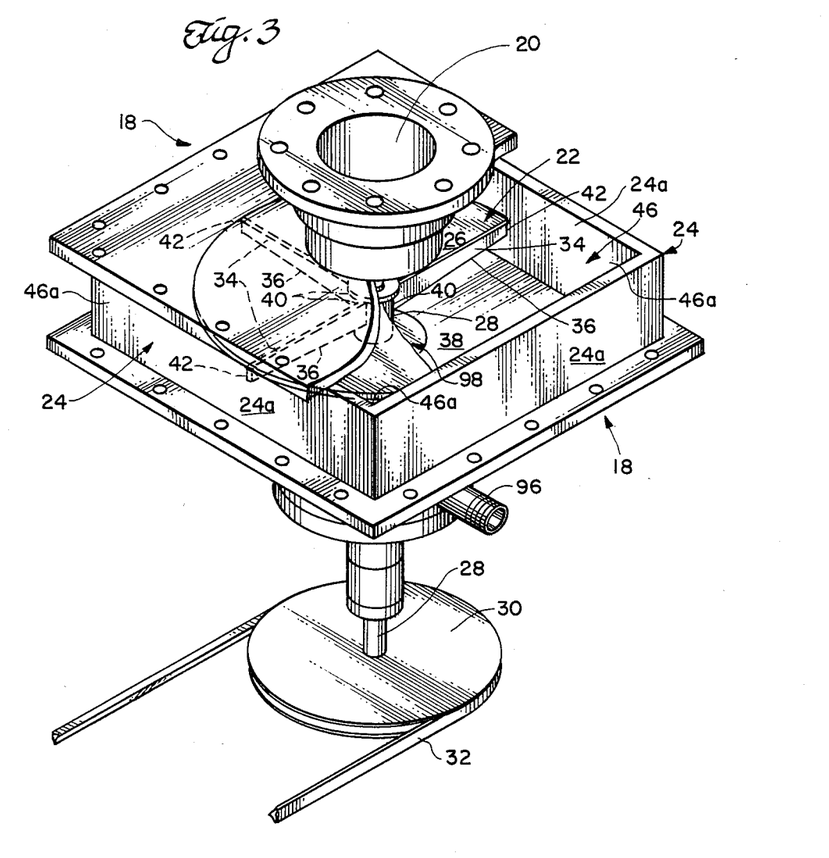
FIG. 3 is a semi-schematic, fragmentary perspective view of the mixing unit of the mixer-settler unit of FIG. 1.

Referring to FIG. 3 in addition to FIGS. 1 and 2, a mixer unit or mixer 18 is attached at its outlet 20 to the bottom end 16, i.e., to the inlet of the extraction column 12. The mixer 18 includes an impeller assembly 22 rotatably mounted in a casing 24. The impeller assembly 22 is circular in horizontal cross section and includes a circular impeller disk 26 fixed to a vertical shaft 28. The shaft 28 can be rotated about its vertical axis to thereby rotate the impeller disk in a horizontal plane. Such shaft rotation is accomplished by means of a pulley 30 on the bottom of the shaft which, in the illustrated embodiment, is driven by an endless belt 32 (shown only in FIG. 3) attached to a drive means such as an electric motor (not shown). A plurality of blades 34 are radially spaced apart from each other on the bottom of the disk and radiate outwardly from the center of the disk to about its perimeter. In the illustrated embodiment, there are four blades 34 on the disk, but more or fewer blades can be used as desired. The blades 34 preferably all have the same shape and extend downwardly from the disk toward the bottom of the casing. It is preferred that each such blade is tapered so that it's bottom edge 36 is closer to the casing bottom 38 at the end 40 of the blade adjacent the center of the disk and is farther from the casing bottom at the end 42 of the blade remote from the center of the disk.

The mixer includes a suction end 44 (best seen in FIGS. 1 and 2) into which liquids to be mixed are introduced and a mixing chamber 46 (best seen in FIGS. 2 and 3) which houses the impeller assembly. Liquids are intimately mixed together in the mixing chamber by the impeller assembly as it spins to thereby form a dispersion of droplets of one of the liquids in the other. As is described below in greater detail, the dispersion formed in the mixing chamber 46 is pumped by the mixer out from its outlet 20, up through the extraction column 12 and into a vertically arranged settling tank assembly 48 where the components of the dispesion are separated.

The settling tank assembly 48 includes an elongated shell 50 which is closed at its bottom end 52 by means of a plate 54. In the illustrated embodiment, the shell 50 is cylindrical and the plate 54 is circular. The extraction column 12 extends vertically through the center of the circular plate 54 and upwardly along the vertical axis of the settling tank shell 50. The open top end 14 of the extraction column 12 is below the top end 56 of the shell.

An elongated cylindrical diverter 58 is housed within the settling tank shell 50. The diverter 58 is a pipe which surrounds and extends downwardly along a top portion 12a of the extraction column 12. The diverter has a closed top 60 (shown in FIG. 2) which is directly above the open top end 14 of the extraction column. In the illustrated embodiment, the diverter 58 surrounds about the top half of the extraction column 12. An open annular space or annulus 62 extends along the length of the diverter between the diverter and the portion 12a of the extraction column surrounded by the diverter. The diverter is open at its bottom end 64 which, in the illustrated embodiment, is at about the center of height of the settling tank assembly.

Because the extraction column 12 and diverter 58 are within the settling tank assembly shell 50 and extend vertically along its longitudinal axis, the volume of the settling tank is defined by the annular space 66 formed between the vertical wall of the shell 50 and the diverter and extraction columns.

The settling tank assembly 48 also includes a baffle assembly 68 mounted in the annular space 66, i.e., mounted in the settling tank. The baffle assembly 68, which is described below in greater detail, includes a plurality of flat disk-shaped baffles 70 that are vertically spaced apart from each other on four elongated vertical supports 72 (shown in FIG. 1). Each of the baffles 70 has a hole 74 through its center with the holes in alignment with each other. The shape and size of the baffles relative to each other can best be understood by referring to FIG. 2 which shows the baffles in cross section. The baffle assembly is mounted in the settling tank with the extraction column 12 and diverter 32 extending vertically through the holes 74 in the disks.

The top 56 of the settling tank assembly is closed by a circular plate 80 on which the diverter 58 is mounted. A pipe section 82 is connected between the top 60 of the diverter 58 and the circular plate 80. The pipe section 82 has a plurality of holes 84 through it. Each such hole 84 provides an outlet for flow of liquids from the top of the settling tank.

In the illustrated embodiment a surge tank 86 closed (but vented) at its top by a circular lid or plate 88 is mounted on top of the settling tank assembly 48. The bottom of the surge tank is the plate 80 which has a hole 90 through its center aligned with the pipe section 82. Thus, the surge tank 86 is in liquid communication with the settling tank via the holes 84 in the pipe section 82 and the hole 90 in the plate 80.

Lighter liquids that separate from the dispersion, rise to the top of the settling tank and flow into the surge tank, are removed therefrom through an outlet line 92. Heavier liquids that separate from the dispersion and sink to the bottom of the settling tank flow from the settling tank through an outlet line 94 near its bottom. The heavier liquids exiting the bottom of the tank flow through an overflow weir system (not shown) which maintains the liquid level in the settling tank.

The components of mixer-settling unit 10 can be of various materials such as plastics or reinforced plastics or various grades of steel or the like. Selection of materials of construction in some cases can depend on the nature of the liquid mediums to be processed in the unit.

Additional features of the construction of the mixer-settler 10 of this invention are described below with regard to its operation.

OPERATION

As is mentioned above, the operation of the mixer-settler unit 10 provided in accordance with this invention is described with regard to extraction of copper from an aqueous solution by contacting the aqueous solution with an organic medium comprising a mixture of "LIX 64N" and kerosene.

To start the liquid-liquid extraction operation, the aqueous medium containing copper ion and the organic medium, e.g., a solution of 20% by volume "LIX 64N" and 80% kerosene, are introduced into the suction end 44 of the mixture 18 through a pair of inlet lines 96 and 97, respectively.

The organic and aqueous mediums are drawn from the inlets 96 and 97 through a cylindrical passage 98 (shown in FIGS. 2 and 3) and into the mixing chamber 46 where they are mixed together by the action of the impeller assembly to form a dispersion of one of the liquids in the other. In one working embodiment the feed rate of both the organic and aqueous mediums into the unit was 17 gallons per minute and the tip speed of the impeller was about 1,000 feet per minute. The rotation of the impeller causes a centrifugal force to be exerted on the aqueous and organic mediums as they are being mixed s that the liquids are forced out from the center of the impeller toward the casing side walls 24a and then out from the casing outlet 20 into the extraction column 12. Having both the inlet to the mixing chamber 46 and the outlet 20 at the center of the mixer leaves no stagnant regions and results in the formation of a dispersion of enhanced uniformity.

As the liquids are forced toward the casing walls at least a portion of such liquids travel along the bottom surfaces 36 of the blades 34. Additionally, during mixer operation vortices are formed in the corners 46a of the mixing chamber. By providing the blades 34 designed as described above with tapered bottom edges and by having a circular impeller in a square casing so that some mixing of liquids is done in the vortices, the formation of a dispersion having desired properties is enhanced. For example, such a desired dispersion has a sufficiently small droplet size so that a desired degree of contact is made between the liquids to effect liquid-liquid extraction while at the same time the dispersion droplets are not so small that separation of the phases from the dispersion is more difficult than desired.

The mixer 18 provided in accordance with this invention provides a sufficient pumping head so that the dispersion formed in the mixer is also pumped by the mixer 18 through the remaining components of the mixer-settler unit 10.

The dispersion exits the mixer 18 through the outlet 20 and is pumped upwardly through the extraction column 12 and out from its top end 14. A packing material, for example rachig rings (not shown), is preferably in the extraction column to aid in maintaining the liquids in a dispersed state as they pass through the column. This prolongs the time that the liquids remain in intimate contact with each other so that a desired degree of extraction is completed.

The dispersion flows downwardly from the top 14 of the extraction column through the annular space 62 and out from the open bottom 64 of the diverter into the settling tank.

As was mentioned above, the purpose of the settling tank assembly 48 is to provide for separation of the aqueous phase from the organic phase once the desired extraction has been completed; e.g., in this case, once the copper has been transferred from the aqueous medium to the mixture of kerosene and "LIX 64N".

In the illustrated embodiment the organic copper containing mixture of kerosene and "LIX 64N" (the organic medium) separates from the dispersion and rises to the top of the settling tank. The organic medium exits the settling tank via the holes 84 in the pipe 82 and enters the surge tank 86. The aqueous (which is now essentially free of copper) separates from the dispersion and settles or sinks to the bottom of the settling tank where it exits via the bottom outlet 94.

In addition to the unique design of the mixer assembly which results in a dispersion of desirable particle size, another key feature of the mixer-settler unit 10 of this invention is the provision in the settling tank of sinuous flow paths which are traversed by the liquid mediums as they separate from the dispersion. For example, the sinuous flow path shown by the arrows 100 is traversed by the organic medium as it separates from the dispersion and rises toward the top of the settling tank. The sinuous flow path shown by the arrows 102 is traversed by the aqueous medium as it separates from the dispersion and sinks toward the bottom of the settling tank.

The sinuous flow paths for both the organic and aqueous mediums are defined by the baffle assembly 68. The assembly 68 is preferably made up of two baffle sections; an upper baffle section 104 comprising a plurality of vertically spaced apart baffles 70*l* located in the top half ot the settling tank and a lower baffle section 106 comprising a plurality of vertically spaced apart baffles 70*b* located in the bottom half of the settling tank. It is preferred that the upper baffle section 104 is located entirely above the dispersion inlet (the diverter outlet 64) and the lower baffle section 106 is located entirely below the dispersion inlet. The baffles 70*a* of the upper baffle section 104 define the sinuous flow path for the relatively lighter organic medium and the baffles 70*b* of the lower baffle section 106 define the sinuous flow path for the aqueous medium. Thus, the baffles 70*a* provide means for repeatedly substantially reversing the horizontal direction of flow of the organic as it rises toward the top of the settling tank and the baffles 70*b* provide means for repeatedly substantially reversing the direction of flow of the aqueous as it sinks toward the bottom of the settling tank. In the illustrated embodiment the shape of the sinuous flow path for the lighter organic medium is the same as the shape of the sinuous flow path for the heavier aqueous medium.

As can best be seen in FIG. 2, the shape and spacing of the baffles that comprise both the upper and lower baffle sections 104 and 106, respectively, are sufficient so that the sinuous flow paths for both the organic and the aqueous require the liquids to turn through relatively smaller angles near the open bottom 64 of the diverter and to turn through progressively larger angles as the respective flow paths approach the top 56 and bottom 52 of the settling tank. The angle through which a liquid must turn when following a sinuous flow path defines the degree of "severity" of the flow path. Thus, as defined herein, a portion of a flow path is relatively "less severe" where the liquid following the path turns through a relatively smaller angle and a portion of such a flow path is relatively "more severe" when the liquid following the path turns through a relatively larger angle.

By providing sinuous flow paths for both the organic and aqueous mediums that are less severe near the open bottom 64 of the diverter and become progressively more severe as the flow paths approach the top and bottom of the settling tank, surprisingly, the separation of the phases from the dispersion is enhanced and carryover of one of the liquid mediums in the other is minimized.

The baffle assembly 68 preferably has a diameter of a size sufficient to provide a space 108 between the outside edges of the baffles 70 and the inside wall of the settling tank assembly shell 50. Thus, aqueous medium, after it separates from the organic medium rising toward the top of the tank can flow downwardly toward the dispersion layer (shown as 110 for purposes of exposition herein) in the space 108. Likewise, organic medium, after it separates from the aqueous medium sinking toward the bottom of the tank, can flow upwardly toward the dispersion layer 110 in the space 108. Providing the space 108 for flow of separated liquids enhances the maintenance of such separation and minimizes carryover.

Another feature of the mixer-settler unit 10 of this invention is that, due to the unique shape and spacing of the baffles, the velocity of the liquid mediums as they traverse their respective sinuous flow paths is alternately increased and decreased, i.e., the liquids are pulsed. This is accomplished by providing a baffle assembly having a design where the space between adjacent baffles or the space between a baffle and an adjacent vertical wall acts as a venturi. Thus, as the liquid medium passes through such a relatively smaller venturi, it speeds up and, as it exits the venturi into a relatively larger space, it slows down. This increase and decrease in velocity is repeated as the liquids travel along their respective sinuous paths. Such pulsing of the liquid velocity enhances the coalescing and separation of the liquids from each other and thus tends to minimize carryover.

Due to the design of the mixer-settler 10 of this invention, the lighter liquid, by the time it reaches the surge tank, comprises the organic medium in the substantial absence of the aqueous phase while the heavier liquid, by the time it reaches the bottom of the settling tank, comprises the aqueous phase in the substantial absence of the organic medium.

In the illustrated embodiment the liquid-liquid extraction apparatus or mixer-settler unit 10 is a single stage. It is, of course, readily possible to adapt the teachings of this invention for multi-stage liquid-liquid extraction. For example, a plurality of single stage mixer-settler units 10 can be connected for counter current or co-current flow as is known in the art to provide a multi-stage extraction plant.

The above description of a preferred embodiment of a mixer-settler unit 10 provided in accordance with this invention is for illustrative purposes. Because of variations which will be apparent to those skilled in the art, the present invention is not intended to be limited to the particular embodiment described hereinabove. The scope of the invention is defined in the following claims.

What is claimed is:

1. Apparatus for contacting a first liquid medium with a second substantially immiscible heavier liquid medium, the apparatus comprising:

(a) an elongated, generally vertical extraction column open at its top and bottom;
(b) means in fluid communication with the open bottom of the extraction column for mixing the first and second liquid mediums together to thereby form a dispersion of droplets of one of the liquid mediums in the other liquid medium and for pumping the dispersion through the extraction column and out its open top;
(c) a settling tank assembly for separating the dispersion, the settling tank assembly including a settling tank wherein the extraction column extends vertically through the bottom of the settling tank with the open top of the extraction column housed within the settling tank, the settling tank assembly also including:
  (i) a baffle assembly comprising a plurality of vertically spaced apart baffles housed within the settling tank wherein an upper section of the baffle assembly defines a sinuous generally upwardly directed flow path for the first liquid medium as it separates from the dispersion and rises to the top of the settling tank and a lower section of the baffle assembly defines a sinuous generally downwardly directed flow path for the second relatively heavier liquid medium as it separates from the dispersion and sinks toward the bottom of the settling tank; and
  (ii) an outlet near the top of the settling tank for removal of the separated first liquid medium and an outlet near the bottom of the settling tank for removal of the separated second liquid medium.

2. An apparatus as is claimed in claim 1 wherein the settling tank assembly includes means for directing the dispersion into the settling tank at about the center of height of the settling tank and wherein the upper baffle assembly section is located entirely above the settling tank center of height and the lower baffle assembly section is located entirely below the settling tank center of height.

3. An apparatus as is claimed in claim 1 wherein the shape and spacing of the baffles that comprise both the upper and lower sections of the baffle assembly are sufficient so that the sinuous flow paths of both the first and second liquid mediums are relatively less severe near the center of height of the settling tank and become progressively more severe as the respective flow paths approach the top and bottom of the settling tank.

4. An apparatus as is claimed in claim 2 wherein the means for directing the dispersion into the settling tank comprises a diverter mounted in the settling tank and extending downwardly along a top portion of the extraction column, the diverter having a closed top spaced vertically above the open top end of the extraction column and an open bottom, wherein an annulus is formed between the diverter and the portion of the extraction column surrounded by the diverter so that the dispersion that flows out from the top of the extraction column flows downwardly in the annulus between the diverter and extraction column and enters the settling tank directly from the open bottom end of the diverter.

5. Apparatus for contacting a first liquid medium with a second substantially immiscible heavier liquid medium, the apparatus comprising:
(a) a settling tank assembly comprising a settling tank having a top and a bottom, wherein an outlet for the first liquid medium is near the top and an outlet for the second liquid medium is near the bottom;
(b) an elongated extraction column, open at its top and extending generally vertically upwardly through the settling tank bottom, the open top of the extraction column being below the top of the settling tank;
(c) a diverter surrounding and extending downwardly along a top portion of the extraction column, the diverter having a closed top and open bottom wherein an annulus is formed between the diverter and the portion of the extraction column surrounded by the diverter;
(d) means in liquid communication with the extraction column for mixing the first and second liquid mediums together to thereby form a dispersion of droplets of one of the liquid mediums in the other liquid medium and for pumping the liquids through the apparatus toward the settling tank outlets, said dispersion flowing from the mixing and pumping means upwardly through the extraction column and out its top, thence downwardly through the annulus between the diverter and extraction column so that the dispersion exits the open bottom of the diverter into the settling tank, the first liquid medium separates from the dispersion, rises to the top of the settling tank and exits the settling tank from the outlet near the settling tank top and the second relatively heavier liquid medium separates from the dispersion, sinks to the bottom of the settling tank and exits the settling tank from the outlet near the settling tank bottom.

6. An apparatus as is claimed in claim 5 wherein the settling tank assembly additionally comprises means in the settling tank for providing a sinuous flow path for the first liquid medium as it separates from the dispersion and rises toward the top of the tank.

7. An apparatus as is claimed in claim 5 wherein the settling tank assembly additionally comprises means in the settling tank for providing a sinuous flow path both for the first liquid medium as it separates from the dispersion and rises toward the top of the settling tank and for the second liquid medium as it separates from the dispersion and sinks toward the bottom of the settling tank.

8. An apparatus as is claimed in claim 7 wherein said means for providing the sinuous flow path comprises a plurality of vertically spaced apart baffles.

9. An apparatus as is claimed in claim 8 wherein the shape and spacing of the baffles are sufficient so that the sinuous flow path for the first liquid medium is relatively less severe near the open bottom of the diverter and becomes progressively more severe as it approaches the top of the settling tank.

10. An apparatus as is claimed in claim 7 wherein said means for providing the sinuous flow paths is a baffle assembly comprising two baffle sections, an upper baffle section comprising a plurality of vertically spaced apart baffles in about the top half of the settling tank for providing the sinuous flow path for the first liquid medium as it separates from the dispersion and rises toward the top of the settling tank and a lower baffle section comprising a plurality of vertically spaced apart baffles in about the bottom half of the settling tank for providing the sinuous flow path for the second liquid medium as it separates from the dispersion and sinks toward the bottom of the settling tank.

11. An apparatus as is claimed in claim 10 wherein the shape and spacing of the baffles that comprise both the upper and lower sections of the baffle assembly are sufficient so that the sinuous flow paths of both the first and second liquid mediums are relatively less severe near the open bottom of the diverter and become progressivley more severe as the respective flow paths approach the top and bottom of the settling tank.

12. An apparatus as is claimed in claim 5 wherein the mixing and pumping means comprises an impeller assembly rotatably mounted in a casing, the impeller assembly being circular in horizontal cross section and the casing being square in horizontal cross section.

13. An apparatus as is claimed in claim 12 wherein the impeller assembly includes a circular impeller disk and a plurality of blades radially spaced apart from each other on the disk, said blades extending downwardly from the disk toward the bottom of the casing, each of the blades being tapered so that the bottom edge of such a blade is relatively nearer the casing bottom at its end proximal to the center of the disk and is relatively farther from the casing bottom at its end remote from the center of the disk.

14. An apparatus as is claimed in claim 5 wherein the settling tank assembly additionally comprises means in the settling tank for alternately increasing and decreasing the velocity of the first and second liquid mediums as they rise and sink respectively toward the top and bottom of the settling tank.

15. An apparatus as is claimed in claim 14 wherein the velocity changing means comprises a plurality of vertically spaced apart baffles.

16. An apparatus for contacting a first liquid medium with a second substantially heavier liquid medium, the apparatus comprising:
(a) means for mixing the first and second liquid mediums together to thereby form a dispersion of droplets of one of the liquid mediums in the other liquid medium;
(b) an elongated settling tank for separating the dispersion;
(c) an elongated extraction column in fluid communication with the mixing means and extending generally vertically through the settling tank bottom, the extraction column open at its top, wherein the settling tank completely surrounds the extraction column and has a top and bottom wherein an outlet for the first liquid medium after it is separated from the dispersion is near the top and an outlet for the second liquid medium after it is separated from the dispersion is near the bottom;
(d) a diverter in the settling tank surrounding and extending downwardly along a top portion of the extraction column, the diverter having a closed top at a relatively higher elevation in the settling tank and an open bottom at a relatively lower elevation in the settling tank, an annulus being between the diverter and the portion of the extraction column surrounded by the diverter;
said mixing means capable of pumping the dispersion upwardly through the extraction column, out the open top of the extraction column, downwardly through the annulus between the diverter and the extraction column and out from the open end of the diverter into the settling tank where the dispersion is separated, the second liquid medium sinking toward the bottom of the settling tank and being removed from the settling tank through the settling tank bottom outlet and the first liquid medium rising toward the top of the settling tank and being removed from the settling tank through the settling tank top outlet.

17. An apparatus as is claimed in claim 16 additionally comprising means in the settling tank for repeatedly substantially reversing the horizontal direction of the flow of both the first and second liquid mediums as they move upwardly and downwardly respectively toward the settling tank outlets.

18. An apparatus as is claimed in claim 17 wherein the flow reversing means comprise a baffle assembly having two sections, an upper section above the open end of the diverter and a lower section below the open end of the diverter, each such baffle section comprising a plurality of vertically spaced apart baffles where each pair of adjacent baffles define therebetween a flow path for the liquid mediums with the flow path between adjacent pairs of such baffles being in generally opposite horizontal directions.

19. An apparatus as is claimed in claim 16 additionally comprising means in the settling tank for providing a sinuous flow path both for the first liquid medium as it separates from the dispersion and rises toward the top of the settling tank and for the second liquid medium as it separates from the dispersion and sinks toward the bottom of the settling tank.

20. An apparatus as is claimed in claim 19 wherein said means for providing the sinuous flow paths includes a baffle assembly comprising two baffle sections, an upper baffle section comprising a plurality of vertically spaced apart baffles in about the top half of the settling tank for providing the sinuous flow path for the first liquid medium as it separates from the dispersion and rises toward the top of the settling tank and lower baffle section comprising a plurality of vertically spaced apart baffles in about the bottom half of the settling tank for providing the sinuous flow path for the second liquid medium as it separates from the dispersion and sinks toward the bottom of the settling tank.

21. An apparatus as is claimed in claim 20 wherein the shape and spacing of the baffles that comprise both the upper and lower sections of the baffle assembly are sufficient so that the sinuous flow paths of both the first and second liquid mediums are relatively less severe near the open bottom of the diverter and become progressively more severe as the respective flow paths approach the top and bottom of the settling tank.

22. An apparatus as is claimed in claim 18 wherein a space for flow of liquids is provided between the outer edge of the baffle assembly and the settling tank wall.

23. An apparatus as is claimed in claim 16 wherein the pumping and mixing means comprises an impeller mounted for rotation in a generally horizontal plane within a casing, said impeller comprising a disk and a plurality of blades radially spaced apart from each other on the bottom of the disk, said blades extending downwardly in the casing, wherein each of the blades is tapered so that its bottom edge is relatively nearer the casing at the end proximal to the center of the impeller disk and is relatively farther from the casing at the end remote from the center of the impeller disk.

24. A method for effecting liquid-liquid contact between a first liquid medium containing a component to be removed therefrom and a second substantially immiscible liquid medium capable of removing said component from the first liquid medium, the first liquid medium having a specific gravity different from the specific gravity of the second liquid medium, the method comprising the steps of:
- (a) mixing the first and second liquid mediums together to form a dispersion of droplets of one of the liquid mediums in the other liquid medium;
- (b) pumping the dispersion through an extraction column to thereby transfer at least a portion of such a component from the first liquid medium into the second liquid medium;
- (c) flowing the dispersion from the extraction column into a settling tank at a dispersion inlet;
- (d) in the settling tank separating the first and second liquid mediums from the dispersion by the steps of:
  - (i) allowing the liquid medium having the lower specific gravity to rise from the dispersion inlet toward the top of the settling tank by traversing a sinuous flow path so that the liquid medium of lower specific gravity is in a layer substantially free of the liquid medium of higher specific gravity at the top of the tank; and
  - (ii) allowing the liquid medium having the higher specific gravity to sink from the dispersion inlet toward the bottom of the settling tank by traversing a sinuous flow path so that the liquid medium of higher specific gravity is in a layer substantially free of the liquid medium of lower specific gravity at the bottom of the tank.

25. The method according to claim 24 wherein the dispersion inlet is at about the center of height of the settling tank.

26. The method according to claim 25 wherein the sinuous path for the liquid medium of lower specific gravity as it separates from the dispersion and rises from the center of height of the settling tank toward the top of the settling tank is relatively less severe at the center of height of the tank and becomes progressively more severe as it nears the top of the tank.

27. The method according to claim 25 wherein the sinuous path for the liquid medium of higher specific gravity as it separates from the dispersion and sinks from the center of height of the settling tank toward the bottom of the settling tank is relatively less severe at the center of height of the tank and becomes progressively more severe as it nears the bottom of the tank.

28. The method according to claim 24 wherein the sinuous flow paths for both the first and second liquid mediums are provided by a plurality of vertically spaced apart baffles in the settling tank.

29. The method according to claim 24 additionally comprising alternately increasing and decreasing the velocity of both the first and second liquid mediums as they traverse their respective sinuous flow paths toward the top and bottom of the settling tank.

30. The method according to claim 24 comprising using a single impeller assembly to mix the first and second liquids together to form the dispersion and to pump the dispersion through the extraction column, the impeller assembly being cricular in horizontal cross section and mounted to rotate in a horizontal plane in a casing that is square in horizontal cross section.

31. The method according to the claim 30 wherein the impeller assembly includes a circular impeller disk and a plurality of blades radially spaced apart from each other in the disk, the blades extending downwardly from the disk toward the bottom of the casing, each of the blades being tapered so that the bottom edge of such a blade is relatively nearer the casing bottom at its end proximal to the center of the disk and is relatively farther from the casing bottom at its end remote from the center of the disk.

32. The method according to claim 24 wherein the first liquid medium is an aqueous solution containing at least one ion species to be removed therefrom and the second liquid medium comprises an organic liquid containing a material capable of removing such an ion species from the aqueous solution.

33. The method according to claim 32 wherein the ion to be removed from the aqueous solution is an ion of copper and the material capable of removing the ion comprises a hydroxy oxime-type liquid ion exchanger.

* * * * *

UNITED STATES PATENT AND TRADEMARK OFFICE
CERTIFICATE OF CORRECTION

PATENT NO. : 4,595,571

DATED : June 17, 1986

INVENTOR(S) : George M. Galik

It is certified that error appears in the above-identified patent and that said Letters Patent is hereby corrected as shown below:

In the Abstract, delete the existing text and insert the following new text:

-- An apparatus is provided that is useful for effecting liquid-liquid extraction by contacting a first liquid medium with a substantially immiscible heavier second liquid medium. The apparatus includes either a single mixer-settler unit or two or more such mixer-settler units in series. Each mixer-settler unit includes a vertically extending settling tank. An elongated extraction column extends generally vertically upwardly through the settling tank bottom. The extraction column is open at its top with the top of the extraction column below the top of the settling tank. A mixer is provided in liquid communication with the extraction column for mixing the first and second liquid mediums together to form a dispersion of droplets of one of the liquid mediums in the other liquid medium and for pumping the liquid mediums through the apparatus. The dispersion flows from the mixer upwardly through the extraction column and out from its top into the settling tank. The first liquid medium separates from the dispersion, rises to the top of the settling tank and exits the settling tank from an outlet near the settling tank top. The second liquid medium separates from the dispersion, sinks to the bottom of the settling tank and exits the settling tank from an outlet near the settling tank bottom. --

UNITED STATES PATENT AND TRADEMARK OFFICE
CERTIFICATE OF CORRECTION

PATENT NO. : 4,595,571

DATED : June 17, 1986

INVENTOR(S) : George M. Galik

It is certified that error appears in the above-identified patent and that said Letters Patent is hereby corrected as shown below:

Column 3, line 49, "dispesion" should read -- dispersion --; column 4, line 65, "dispesion" should read -- dispersion --; column 6, line 18, "mixture" should read -- mixer --; column 6, line 31, change "s" to -- so --; column 7, line 34, "701" should read -- 70a --; column 7, line 35, "ot" should read -- of --.

Signed and Sealed this

Twenty-third Day of February, 1988

Attest:

DONALD J. QUIGG

*Attesting Officer*  *Commissioner of Patents and Trademarks*